March 15, 1927.

J. JACOBS 1,620,818

TIRE FLAP

Filed Sept. 24, 1925

Inventor
Joe Jacobs.
By A. J. O'Brien
Attorney.

Patented Mar. 15, 1927.

1,620,818

UNITED STATES PATENT OFFICE.

JOE JACOBS, OF DENVER, COLORADO.

TIRE FLAP.

Application filed September 24, 1925. Serial No. 58,297.

This invention relates to improvements in tire flaps.

It is customary to provide a fabric flap between the inside of the tire casing and the inner tube so as to protect the inner tube from wear caused by coming in contact with the rim and from pinching by the toes of the beads of the tire casing.

The usual flap is made of square woven, light weight cotton fabric which shrinks in both directions when it gets wet. The shrinkage produces wrinkles that damage the flap and shortens its length so that it moves off center and pulls to one side thereby causing an abrupt angle on one side that punctures the inner tube.

It is evident that a tire flap to be ideally constructed to produce the best results should be longitudinally elastic and have very little, if any, transverse elasticity. It should preferably be made of rubber with smooth sides and feather edges as rubber will not deteriorate when it becomes wet and always presents a smooth surface towards the inner tube.

It is the object of this invention to produce a tire flap of flexible elastic cord material which shall be so constructed that it will stretch in the direction of its length but be reenforced transversely by cord and which will not shrink.

My improved flap, briefly described, consists of a strip of cord material cut transversely of the cords, so that the cords extend transversely of the strip. This strip is then heavily coated with rubber on both sides or is placed between two layers of rubber and vulcanized in place. The cords will prevent the strip from yielding transversely but as there are no cords running lengthwise, the flap is very elastic in the direction of its length.

In order more clearly to describe my invention and to explain its construction and use, I shall have reference to the accompanying drawings in which.

Numeral 1 designates a tire rim such as are usually employed with straight side tires and 2 represents the tire casing. An inner tube 3 is shown in place within the casing and this is spaced from the beads of the tire and from the inner surface of rim 1 by means of my improved flap 4.

Figure 1:
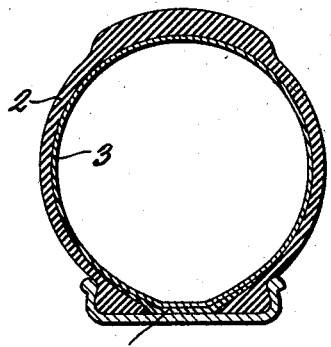
Fig. 1 is a section through a tire casing and rim and shows my improved tire flap in place between the inner tube and the casing.
Figure 2:
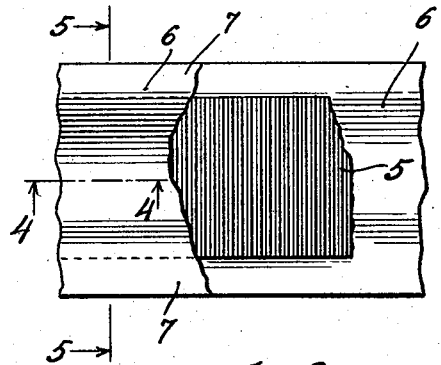
Fig. 2 is a plan view of a portion of the flap showing parts thereof removed so as to expose the reenforcing cords which extend transversely.
Figure 3:
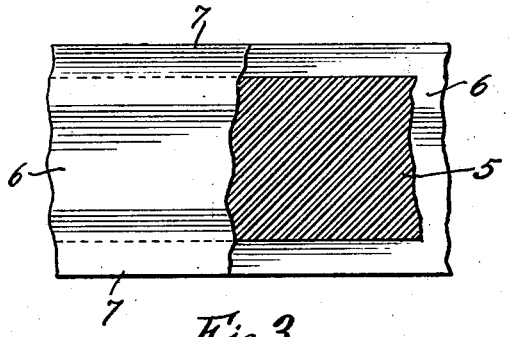
Fig. 3 is a view similar to that of Fig. 2 but shows the cords placed diagonally.
Figure 4:
Fig. 4 is a section taken on line 4—4, Fig. 2.
Figure 5:
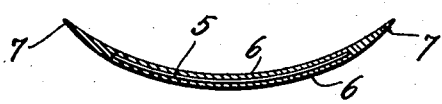
Figs. 5 and 6 are transverse sections showing two different shapes.
Figure 7:
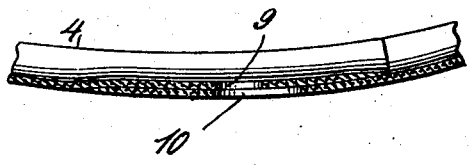
Fig. 7 is a longitudinal section through the overlapping ends and shows the valve stem opening and feather edges.
Figure 6:
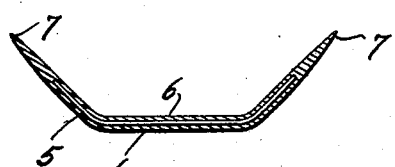

My improved flap is formed from a strip 5 of cord fabric which is vulcanized in place between two rubber layers 6 whose edges are made thin so as to produce a flap with feather edges 7. In Fig. 2 I have shown a construction in which the cords extend straight across the flap whereas in the construction shown in Fig. 3, the cords extend diagonally. When the flap is constructed in the manner shown in Fig. 2 there is no transverse elasticity as the cords do not stretch. In a longitudinal direction, however, the flap is very elastic as the transverse cords do not interfere in any way with the flap being stretched in the direction of its length. The fact that the flap is freely extensible lengthwise is of great importance as it makes it possible to employ it with clincher tires that are stretched over the rims. This is not practicable with the ordinary canvas flaps which do not stretch. The real strain on a flap of this kind is in a transverse direction and this is resisted by the cords. When and if it is desired that the flap shall have a limited transverse elasticity, the cords may be run on a bias in the manner shown in Fig. 3. It is obvious that the transverse elasticity will increase directly with the angle that the cords make with the transverse line and that it will permit free transverse yielding when the cords extend parallel with the longitudinal axis of the flap. The inclination of the cords with respect to the transverse direction of the flap must, of course, be rather small as transverse elasticity is not essential although it may at times be desirable to a very limited extent.

From the above it will be evident that I have produced a tire flap reenforced with cord fabric which extends transversely of or on a slight bias across the flap which permits free longitudinal extension, but a very limited transverse extension. As the flap is made from cord fabric embedded in rubber, all danger of shrinkage in either direction is obviated and as the cords extend transversely it will have the maximum strength to resist crosswise strains. The feather edges protect the tube against chafing and the great flexibility and longitudinal elasticity permits the flap to readily conform to the sides of the casing. Although it has been shown as a strip, it may be made into an endless or ring form which can be moulded into the proper size and shape. A flap constructed in accordance with the disclosure lasts longer and gives better service than the fabric flaps now employed and will not pinch the inner tubes. Openings 8 and 9 are provided near the ends of the strip for the reception of the valve stem. As the cords extend transversely, no additional reenforcing is necessary around the stem opening.

Having now described my invention, what I claim as new is:

1. A tire flap comprising a strip of cord fabric having the cords extending transversely thereof and a rubber covering on each side of the strip.

2. A tire flap having means that substantially prevents stretching in a transverse direction but which permits free stretching in the direction of the length of the flap.

In testimony whereof I affix my signature.

JOE JACOBS.